US008525848B2

(12) United States Patent
Janson

(10) Patent No.: US 8,525,848 B2
(45) Date of Patent: Sep. 3, 2013

(54) POINT CLOUD DECIMATION ENGINE

(75) Inventor: Carl Christer Janson, San Rafael, CA (US)

(73) Assignee: Autodesk, Inc., San Rafael, CA (US)

( * ) Notice: Subject to any disclaimer, the term of this patent is extended or adjusted under 35 U.S.C. 154(b) by 961 days.

(21) Appl. No.: 12/619,490

(22) Filed: Nov. 16, 2009

(65) Prior Publication Data

US 2011/0115783 A1     May 19, 2011

(51) Int. Cl.
*G09G 5/00* (2006.01)
*G06F 15/00* (2006.01)
*G06K 9/32* (2006.01)

(52) U.S. Cl.
USPC ............ 345/606; 345/643; 345/501; 382/300

(58) Field of Classification Search
USPC ................. 345/418–428, 581, 586, 606, 618, 345/643, 644, 501, 530, 548; 382/201, 254, 382/274, 276, 282, 300, 305, 307; 707/999.007, 707/999.1
See application file for complete search history.

(56) References Cited

U.S. PATENT DOCUMENTS

| | | | |
|---|---|---|---|
| 7,215,810 B2 | 5/2007 | Kaufmann et al. | |
| 7,420,555 B1 | 9/2008 | Lee | |
| 7,804,498 B1 | 9/2010 | Graham et al. | |
| 7,921,002 B2 | 4/2011 | Kamatsuchi | |
| 8,179,393 B2 | 5/2012 | Minear et al. | |
| 2005/0203930 A1* | 9/2005 | Bukowski et al. | ............ 707/100 |
| 2006/0290695 A1 | 12/2006 | Salomie | |
| 2009/0060345 A1 | 3/2009 | Wheeler et al. | |
| 2010/0172567 A1 | 7/2010 | Prokoski | |
| 2010/0201682 A1 | 8/2010 | Quan et al. | |

OTHER PUBLICATIONS

Du, Zhiqiang, et al., "A New Method of Storage and Visualization for Massive Point Cloud Dataset", 22nd CIPA Symposium, Oct. 11-15, 2009, Kyoto, Japan, all pages.
Huang, Hui, et al., "Consolidation of Unorganized Point Clouds for Surface Reconstruction", ACM SIGGRAPH Asia 2009, Article No. 176, 10.1145/1661412.1618522, all pages.
Manson, J., et al., "Streaming Surface Reconstruction Using Wavelets", Eurographics Symposium on Geometry Processing 2008, Pierre Alliez and Szymon Rusinkiewicz (Guest Editors), vol. 27 (2008), No. 5, all pages.
Morales, R., et al., "Unstructured Point Cloud Surface Denoising and Decimation Using Distance RBF K-Nearest Neighbor Kernel", Advances in Multimedia Information Processing, Lecture Notes in Computer Science, G. Qiu et al. (Eds.): PCM 2010, Part II, LNCS 6298, pp. 214-225, 2010.
PCT International Search Report and Written Opinion dated Jul. 3, 2012, International Application No. PCT/US2012/030300.

* cited by examiner

*Primary Examiner* — Wesner Sajous
*Assistant Examiner* — Andrew Shin
(74) *Attorney, Agent, or Firm* — Gates & Cooper LLP

(57) ABSTRACT

A method, apparatus, article of manufacture, and computer readable storage medium provide the ability to visualize a point cloud dataset. A grid, having cells, is mapped over the point cloud dataset. The points are sorted and a contribution factor is computed for each cell. Each cell and its contribution factor is stored. A viewing area and total number of viewing points is determined. The cells are intersected with the viewing area to determine visible cells. The contribution factors for the visible cells are accumulated and divided into the total viewing points to determine a point extraction value. A number of points to read (and display) from each visible cell is determined by multiplying the contribution factor of each visible cell by the point extraction value.

21 Claims, 3 Drawing Sheets

POINT CLOUD DECIMATION ENGINE

BACKGROUND OF THE INVENTION

1. Field of the Invention

The present invention relates generally to visualizing data points, and in particular, to a method, apparatus, and article of manufacture for quickly visualizing large point cloud data at a high resolution.

2. Description of the Related Art

Point clouds are often created by three-dimensional (3D) scanners that measure a large number of points (e.g., from thousands to many billions of points [3D coordinates]) on the surface of an object, and output a point cloud as a data file. The point cloud represents the visible surface of the object that has been scanned or digitized. To quickly examine and visualize the dataset, some form of indexing or organization of the dataset is required. Prior art solutions fail to provide a quick and easy mechanism to both pre-process and view points in a dataset. Such problems may be better understood with a detailed description of prior art point cloud pre-processing and viewing methodologies.

Point clouds may be used for many purposes including to create computer-aided design (CAD) models for parts, animation, rendering, and/or large customization applications. However, due to the size and number of points in a point cloud, point cloud datasets are rarely directly used in 3D applications. Instead, the point cloud dataset may be converted to a triangle mesh model, a NURBS (non-uniform rational B-spline) surface model, or a CAD model. However, each of conversions involves significant pre-processing and does not provide an efficient mechanism for visualizing point cloud data in real time.

As part of the visualization processing, prior art solutions often involve creating a spatial index, often by creating a hierarchical representation of the point data. For example, a grid may be used to perform a tessellation of the point cloud data set that divides the dataset into a series of cells. Each cell can then be assigned a unique identifier and used for spatial indexing. However, such spatial index/hierarchical representation creation has numerous drawbacks. For example, pre-processing time can be extensive, often extending several hours or more. In addition, point extraction (e.g., the selection and viewing of a subset of the cloud point data) can be slow due to the amount of seeks (the process of moving a read head to a different location on a disk) required to gather the points from disk. In this regard, point data is often stored at multiple resolutions, resulting in large index and data files, significantly impacting the speed to extract and view a subset of the datapoints, and also significantly impacting the memory required to store the extra resolutions).

Accordingly, what is needed is the capability to rapidly index a point cloud data set while providing for rapid point extraction and viewing (e.g., in real time).

SUMMARY OF THE INVENTION

One or more embodiments of the invention provide the ability to visualize an arbitrarily large point cloud at high resolution. A grid is mapped over the point cloud and the points are sorted within each cell of the grid. A contribution factor for each cell is computed (representing how many points in each cell contributes to the total points of the point cloud). After defining a viewing area, the contribution factors for the cells within the viewing area (visible cells) are accumulated. A subset of points within each visible cell are then read and returned/displayed.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide a way to quickly organize point cloud data so that any number of points can be extracted for any given view in, or close, to real-time. Accordingly, embodiments enable real-time interaction with an arbitrarily large point cloud at a high resolution.

Hardware Environment

Figure 1:
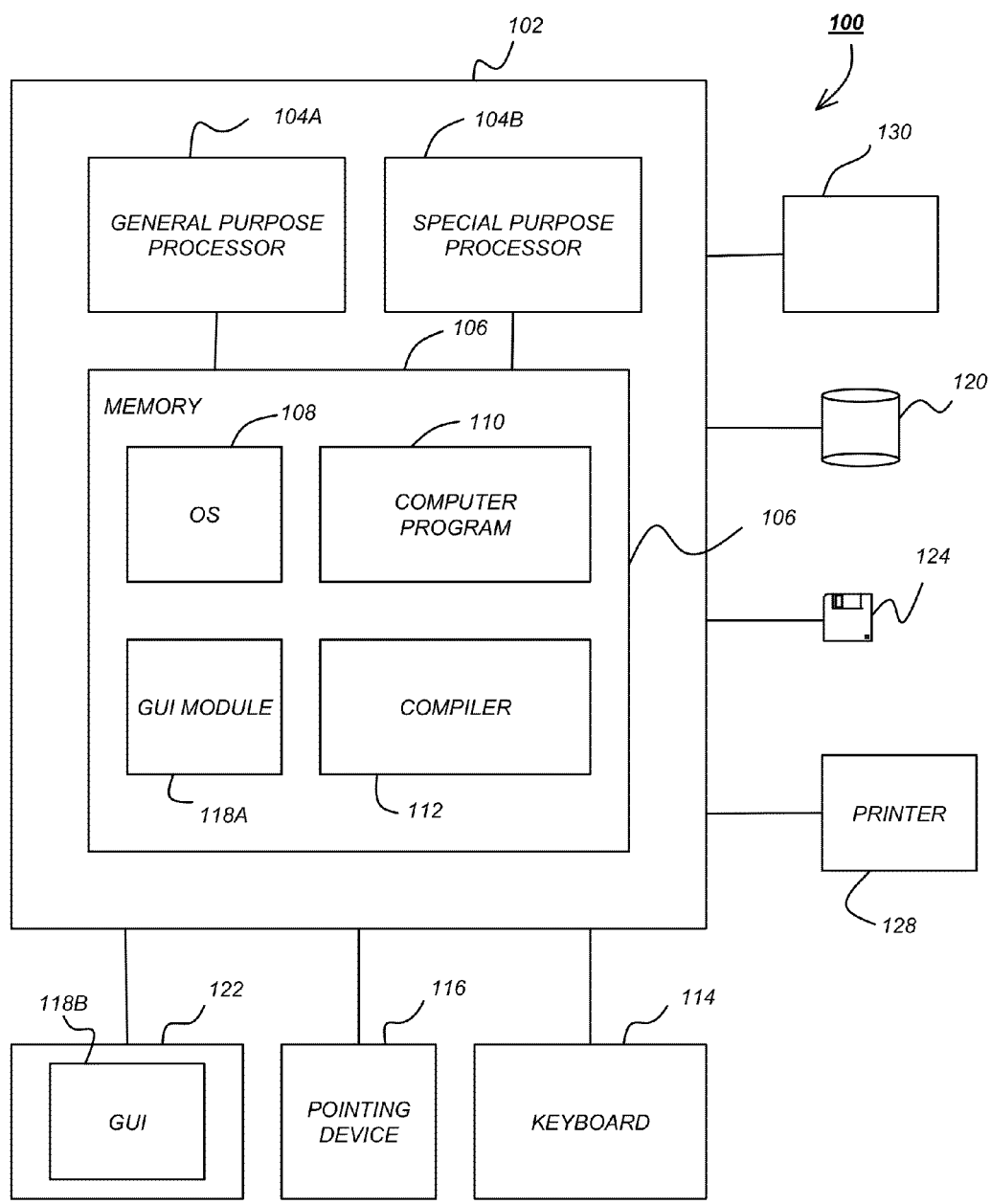
FIG. 1 is an exemplary hardware and software environment 100 used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to other devices, including input/output (I/O) devices such as a keyboard 114, a cursor control device 116 (e.g., a mouse, a pointing device, pen and tablet, etc.) and a printer 128.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Each liquid crystal of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

Some or all of the operations performed by the computer 102 according to the computer program 110 instructions may be implemented in a special purpose processor 104B. In this embodiment, some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Although the term "user computer" or "client computer" is referred to herein, it is understood that a user computer 102 may include portable devices such as cell phones, notebook computers, pocket computers, personal digital assistants, or any other device with suitable processing, communication, and input/output capability.

Software Embodiments

Embodiments of the invention may be implemented on computer 100 and display a CAD or other graphical user interface on GUI module 118A of computer 100. In this regard, embodiments of the invention provide the ability to visualize large point cloud data that is stored in memory 106, in database 120, or on disk 124 on GUI module 118A.

Figure 2:
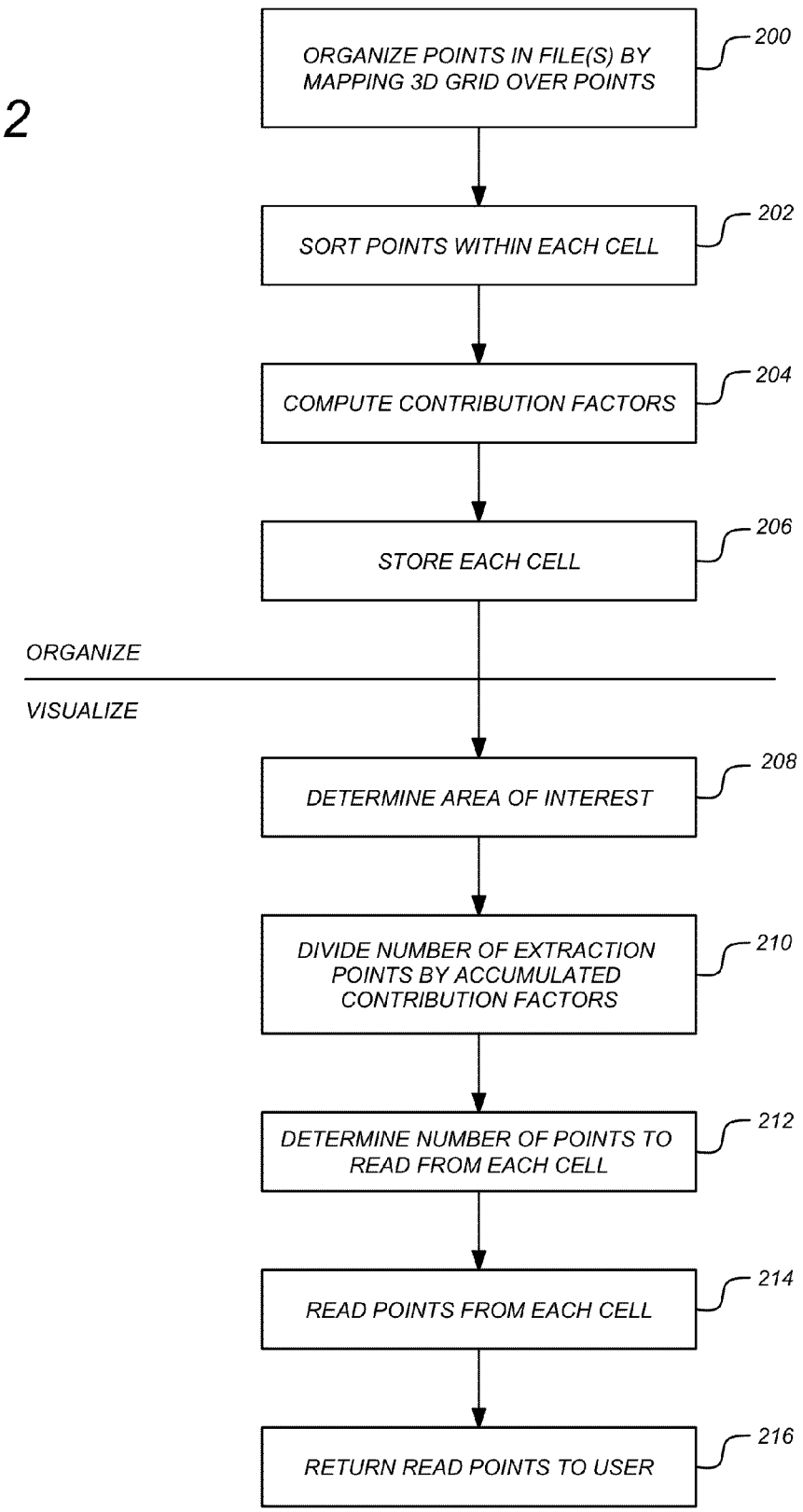
FIG. 2 is a flow chart illustrating the logical flow for visualizing point cloud data in accordance with one or more embodiments of the invention.

FIG. 2 is a flow chart illustrating the logical flow for visualizing point cloud data in accordance with one or more embodiments of the invention. To visualize the point cloud dataset, the points are first organized into a file, or a set of files (e.g., onto a data storage device/database 120) at step 200. This may be done by taking the geometric extents of the point cloud and mapping a grid (having one or more cells) over it. Such a grid may be either two-dimensional (2D) or three-dimensional (3D). For example, a 2D grid may be mapped over a point cloud that was scanned from above using a scanner attached to an aircraft or other GIS (geographic information system) use case. Similarly, a 3D grid may be mapped over a 3D point cloud. Further, in alternative embodiments, the grid may have two or more cells. The grid spacing determines the performance characteristic of the point cloud. If there are too few cells, it may not be possible to visualize the full resolution of the data set when zoomed in on a small area. Similarly, if there are too many cells, performance may suffer since the number of seek operations on disk is proportional to the number of cells containing point data. In this regard, the amount of time to read data is often spent moving a read head to a new location on disk. By only having to move the readhead once per cell (in accordance with embodiments of the invention), performance gains can be realized.

All cells may be contained in one single file on disk. Alternatively, to limit the size of the file (or for other reasons), a file can be split into multiple files as needed. Alternatively, each cell can be represented by a different file.

Figure 3:
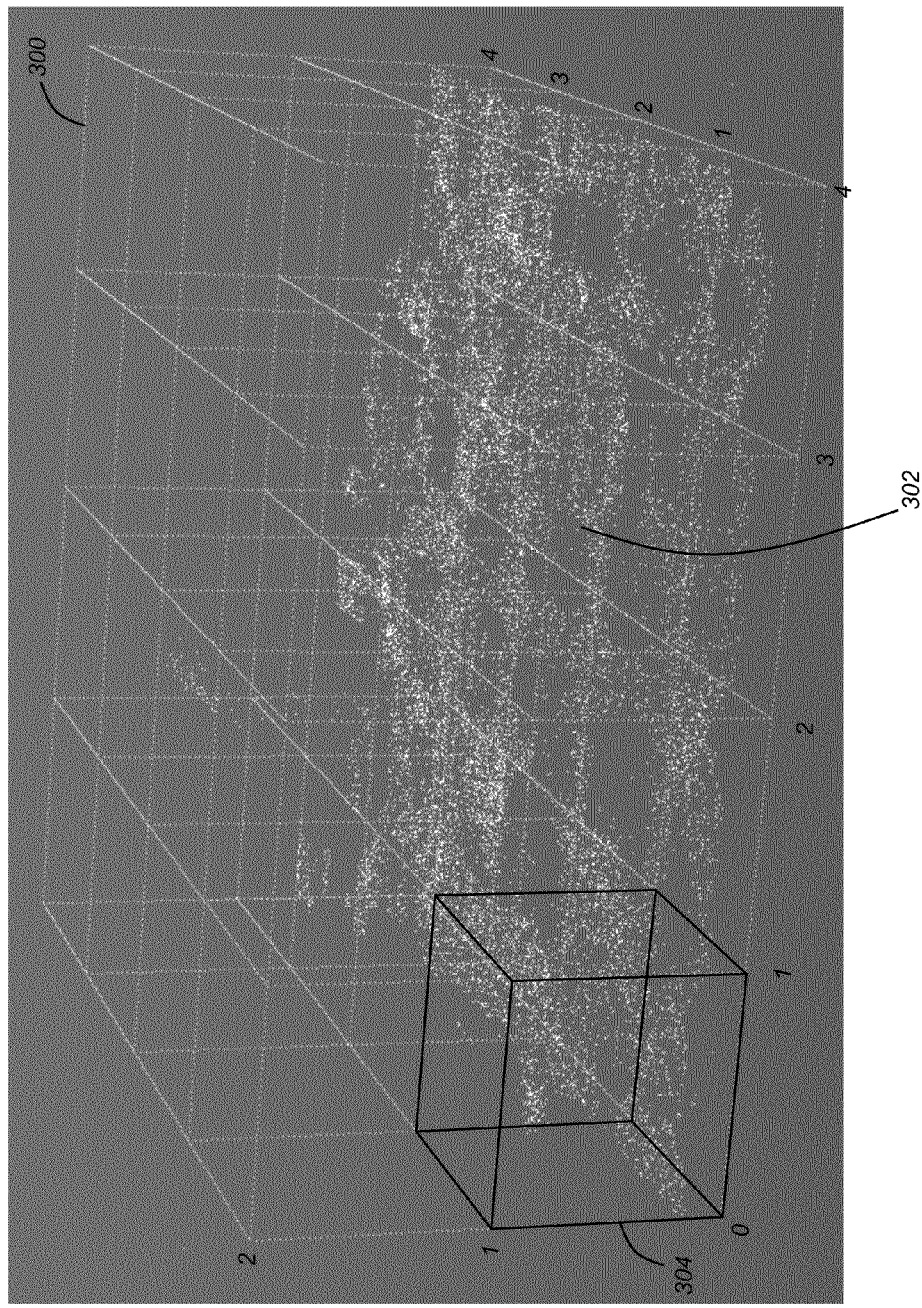
FIG. 3 illustrates a small point cloud with a 4×4×2 grid overlay in accordance with one or more embodiments of the invention.

FIG. 3 illustrates a small point cloud with a 4×4×2 grid overlay in accordance with one or more embodiments of the invention. As illustrated, the grid overlay 300 is mapped over the point cloud data set 302 with various cells 304 containing portions of the point cloud data set 302.

Various methods may be used to determine the grid spacing. For example, one method takes all of the points in the point cloud, assumes that the cloud is somewhat uniform and divides up the point cloud into cubical cells with a size so that the average cell contains around 200.000 points. Effectively, it takes the number of points and divides by 200.000 to provide a rough cell count. The size of the cells may then be determined by mapping the determined number of cells into a point cloud bounding box. The reason for using the number 200.000 is to provide the ability to display a couple of cells in full resolution while still not displaying much more than a million points (which is where many computers start reaching their limits). As an alternative to the above method, a more exact, but slower, approach would be to start with one box wrapping the whole point cloud, and repeatedly subdividing the grid until the cells have a reasonable number of points in them.

Once the cell structure (i.e., spacing) has been determined, at step 202, the points that fall into each cell 304 are sorted in order so that when reading a cell 304 from the beginning, the cells 304 relative point distribution is maintained regardless of how many points are read (and regardless of how many points are in the point cloud dataset). There are various ways to sort the points. For example, the point order in each cell 304 can be randomized so that the statistical probability manages the point distribution. Alternatively, a more deterministic approach can be taken to sort the points. For example, the points can be sorted using bit reversal or Fast Fourier Transform bit reversal.

When the points are sorted (or shortly after) at step 202, the relative density, or contribution factor, of each cell 304 is also computed at step 204. For example, if the cell 304 with the most points has 1000 points in it, its contribution will be 1.0 and another cell 304 with 500 points will have a relative density of 0.5. Accordingly, the contribution factor for each cell is calculated as a ratio:

$$\frac{\text{actual points}}{\text{max points}}$$

where max points represents the number of points in the cell that has the maximum number of points (compared to all cells) and actual points represents the actual number of points within each cell.

Once the points are sorted at step 202 and the contribution factor for each cell is determined at step 204, each cell 304 (and each cell's contribution factor) is stored at step 206 (e.g., written to disk, stored in a database, stored in persistent memory, or stored in temporary memory—RAM).

Steps 200-206 describe the process for organizing the dataset 302. The remaining steps of FIG. 2 describe the process for extracting or viewing/visualizing a desired subset of the point cloud dataset 302.

To view the point cloud 302, one first determines the area of interest (referred to herein as the viewing area) (for example, bounding box or a view frustum) and the total number of points to extract (referred to herein as the total viewing points). Accordingly, at step 208, the area/region of interest is determined. Such a determination may be made by the user drawing or placing a bounding box over the desired viewing area (i.e., user input identifies the region of interest). Further, the user may select the number of points (i.e., the level of resolution desired). Alternatively, a default viewing area and number of points may be utilized.

At step 210, the one or more cells 304 of the grid are intersected with the defined view/viewing area to determine which cells 304 are visible (referred to herein as visible cells). In other words, based on the view/area of interested selected/defined by the user, the cells 304 that fall within or touch that area are determined. In one or more embodiments, a cell 304 merely needs to have some portion that intersects with the defined view, while in other embodiments, the entire cell 304 must be within the defined view to be selected. The cells 304 that intersect with the defined view are referred to herein as visible cells.

At step 210, the contribution factors for all visible cells are accumulated. The desired number of points/total viewing points (i.e., the selected resolution to view) is divided with this value. The quotient/result value (referred to herein as the point extraction value) represents the number of points to extract for each cell 304 if the cell contribution factor is 1.0. For example, if the user desires to view an area of a point cloud data set containing 100,000 points and the contribution factors for the visible cells is 50, the point extraction value would reveal that for a cell 304 having a contribution factor of 1.0, 2000 points (i.e., 100,000/50) would be extracted.

The next step is to determine how many points are to be extracted from each particular cell 304. Such a determination is simple based on the contribution factor for each cell 304. Accordingly, at step 212, for each cell 304, the cell's contribution factor is multiplied with the point extraction value to obtain the number of points to read from that particular cell 304.

At step 214, the determined number of points is read from each cell 304 in a single read operation. In other words, a single read operation per cell 304 may be used to read the appropriate points. Accordingly, the total number of reads for a single query is typically the same as the number of visible cells.

At step 216, the points are returned to the caller (and/or displayed on a displayed device) and represent the visible part of the point cloud with desired resolution.

The benefit of utilizing the approach of FIG. 2 is that regardless of how many points the user desires to extract from a given view, the number of seek and read operations remain constant (ignoring external factors such as disk fragmentation). Minimizing the number of seek and read operations can be the key to achieving high performance.

In view of the above, embodiments of the invention provide for very fast indexing in linear time (measured at over 40 million points per minute), very fast point extraction (usually >30 fps extracting a million points from 100s of millions), and seamless progressive resolution refinement (using point sort order to support arbitrary resolution).

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. Further, embodiments of the invention provide a very low overhead, platform independent solution that can scale from small handheld systems to large server bases systems with multi-billion point capabilities.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for visualizing a point cloud dataset comprising:

mapping, in a computer, a grid over points in the point cloud dataset, wherein the grid comprises one or more cells;

sorting the points in each cell;

computing a contribution factor for each cell on a per cell basis, wherein the contribution factor comprises a relative density of the points in each cell;

storing each cell and the cell's contribution factor;

determining a viewing area and total viewing points;

intersecting the one or more cells with the viewing area to determine one or more visible cells;

accumulating the contribution factors for the one or more visible cells;

dividing the total viewing points by the accumulated contribution factors to determine a point extraction value;

calculating a number of points to read from each visible cell on a per cell basis by multiplying the contribution factor of each visible cell by the point extraction value;

reading the number of points from each visible cell; and displaying the number of points that are read on a display device.

2. The method of claim 1, wherein the mapping comprises organizing points from the point cloud data set into a set of one or more files.

3. The method of claim 1, wherein the sorting provides that a relative point distribution within the cells is maintained regardless of the number of points in the point cloud dataset.

4. The method of claim 1, wherein the contribution factor for each cell comprises a ratio of actual/points max points, wherein max points represents the number of points in the cell that has the maximum number of points compared to all cells and actual points represents the actual number of points within each cell.

5. The method of claim 1, wherein the determining the viewing area comprises accepting user input identifying a region of interest.

6. The method of claim 1, wherein the reading is performed in a single read operation per visible cell.

7. The method of claim 1, further comprising returning the number of points that are read to the user.

8. An apparatus for visualizing a point cloud dataset in a computer system comprising:
    (a) a computer having a memory;
    (b) an application executing on the computer, wherein the application is configured to:
        (i) map, in a computer, a grid over points in the point cloud dataset, wherein the grid comprises one or more cells;
        (ii) sort the points in each cell;
        (iii) compute a contribution factor for each cell on a per cell basis, wherein the contribution factor comprises a relative density of the points in each cell;
        (iv) store each cell and the cell's contribution factor;
        (v) determine a viewing area and total viewing points;
        (vi) intersect the one or more cells with the viewing area to determine one or more visible cells;
        (vii) accumulate the contribution factors for the one or more visible cells;
        (viii) divide the total viewing points by the accumulated contribution factors to determine a point extraction value;
        (ix) calculate a number of points to read from each visible cell on a per cell basis by multiplying the contribution factor of each visible cell by the point extraction value;
        (x) read the number of points from each visible cell; and
        (xi) display the number of points that are read on a display device.

9. The apparatus of claim 8, wherein the application is configured to map by further organizing points from the point cloud data set into a set of one or more files.

10. The apparatus of claim 8, wherein the application is configured to sort wherein a relative point distribution within the cells is maintained regardless of the number of points in the point cloud dataset.

11. The apparatus of claim 8, wherein the contribution factor for each cell comprises a ratio of actual points/max points, wherein max points represents the number of points in the cell that has the maximum number of points compared to all cells and actual points represents the actual number of points within each cell.

12. The apparatus of claim 8, wherein the application is configured to determine the viewing area by accepting user input identifying a region of interest.

13. The apparatus of claim 8, wherein the application is configured to read using a single read operation per visible cell.

14. The apparatus of claim 8, wherein the application is further configured to return the number of points that are read to the user.

15. A non-transitory computer readable storage medium encoded with computer program instructions which when accessed by a computer cause the computer to load the program instructions to a memory therein creating a special purpose data structure causing the computer to operate as a specially programmed computer, executing a method of visualizing a point cloud dataset, comprising:
    mapping, in the specially programmed computer, a grid over points in the point cloud dataset, wherein the grid comprises one or more cells;
    sorting, in the specially programmed computer, the points in each cell;
    computing, in the specially programmed computer, a contribution factor for each cell on a per cell basis, wherein the contribution factor comprises a relative density of the points in each cell;
    storing, in the specially programmed computer, each cell and the cell's contribution factor;
    determining, in the specially programmed computer, a viewing area and total viewing points;
    intersecting, in the specially programmed computer, the two or more cells with the viewing area to determine one or more visible cells;
    accumulating, in the specially programmed computer, the contribution factors for the one or more visible cells;
    dividing, in the specially programmed computer, the total viewing points by the accumulated contribution factors to determine a point extraction value;
    calculating, in the specially programmed computer, a number of points to read from each visible cell on a per cell basis by multiplying the contribution factor of each visible cell by the point extraction value;
    reading, in the specially programmed computer, the number of points from each visible cell; and
    displaying, in the specially programmed computer, the number of points that are read on a display device.

16. The non-transitory computer readable storage medium of claim 15, wherein the mapping comprises organizing points from the point cloud data set into a set of one or more files.

17. The non-transitory computer readable storage medium of claim 15, wherein the sorting provides that a relative point distribution within the cells is maintained regardless of the number of points in the point cloud dataset.

18. The non-transitory computer readable storage medium of claim 15, wherein the contribution factor for each cell comprises a ratio of actual points/max points, wherein max points represents the number of points in the cell that has the maximum number of points compared to all cells and actual points represents the actual number of points within each cell.

19. The non transitory computer readable storage medium of claim 15, wherein the determining the viewing area comprises accepting user input identifying a region of interest.

20. The non-transitory computer readable storage medium of claim 15, wherein the reading is performed in a single read operation per visible cell.

21. The non-transitory computer readable storage medium of claim 15, further comprising returning, in the specially programmed computer, the number of points that are read to the user.

* * * * *